United States Patent
Stählin et al.

(10) Patent No.: US 9,772,191 B2
(45) Date of Patent: Sep. 26, 2017

(54) METHOD FOR DETERMINING POSITION DATA OF A VEHICLE

(75) Inventors: Ulrich Stählin, Eschborn (DE); Klaus Rink, Rodenbach (DE); Stefan Günthner, Frankfurt am Main (DE)

(73) Assignee: CONTINENTAL TEVES AG & CO. OHG, Frankfurt (DE)

(*) Notice: Subject to any disclaimer, the term of this patent is extended or adjusted under 35 U.S.C. 154(b) by 170 days.

(21) Appl. No.: 14/343,993

(22) PCT Filed: Sep. 12, 2012

(86) PCT No.: PCT/EP2012/067862
§ 371 (c)(1),
(2), (4) Date: May 7, 2014

(87) PCT Pub. No.: WO2013/037840
PCT Pub. Date: Mar. 21, 2013

(65) Prior Publication Data
US 2014/0244169 A1    Aug. 28, 2014

(30) Foreign Application Priority Data
Sep. 12, 2011 (DE) .......... 10 2011 082 532

(51) Int. Cl.
*G01C 21/00* (2006.01)
*G01C 21/20* (2006.01)

(52) U.S. Cl.
CPC .................. *G01C 21/20* (2013.01)

(58) Field of Classification Search
CPC ...................................... G01C 21/20
USPC .................................. 701/523, 503
See application file for complete search history.

(56) References Cited

U.S. PATENT DOCUMENTS

| | | | |
|---|---|---|---|
| 2008/0154495 A1* | 6/2008 | Breed | G01C 21/20 701/472 |
| 2008/0243378 A1* | 10/2008 | Zavoli | G01C 21/28 701/533 |
| 2009/0122133 A1 | 5/2009 | Hartman | |
| 2010/0106356 A1* | 4/2010 | Trepagnier | G01S 17/023 701/25 |
| 2013/0103308 A1* | 4/2013 | Siris | G01S 19/07 701/482 |

FOREIGN PATENT DOCUMENTS

DE    10 2006 029 148 A1    1/2008
EP    WO 2011/098333 A1    8/2011

OTHER PUBLICATIONS

PCT International Search Report—Mar. 1, 2013.
German Examination Report—Jul. 31, 2013.

* cited by examiner

*Primary Examiner* — Calvin Cheung
*Assistant Examiner* — Paula L Schneider
(74) *Attorney, Agent, or Firm* — Brinks Gilson & Lione

(57) ABSTRACT

A method for determining location data for a vehicle, a control apparatus for performing the method, and to a vehicle having the control apparatus. The method includes measuring the driving dynamics data for the vehicle, measuring at least one distance of the vehicle from a stationary object and recording a distance, and filtering the driving dynamics data on the basis of the recorded distance.

8 Claims, 1 Drawing Sheet

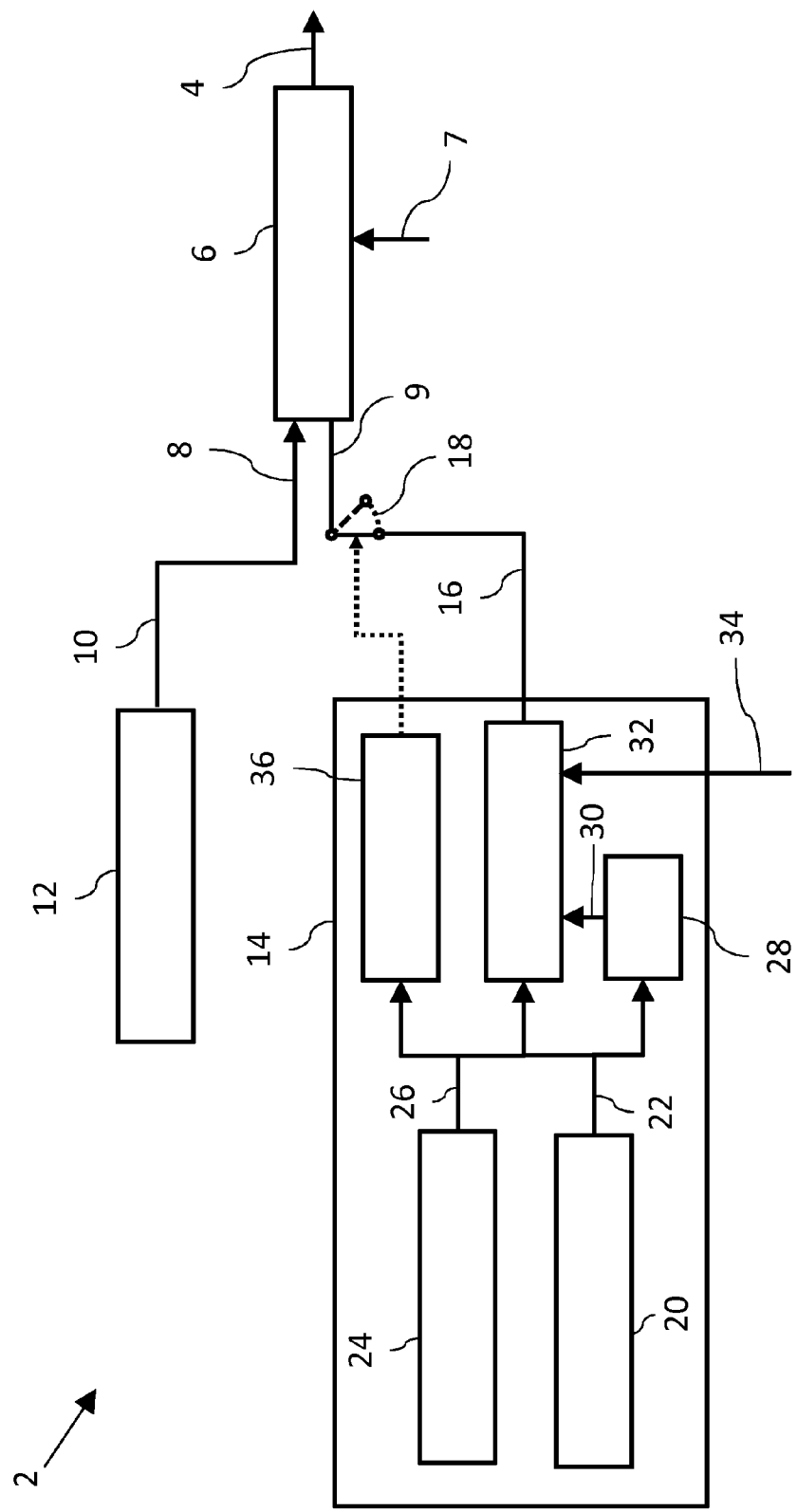

METHOD FOR DETERMINING POSITION DATA OF A VEHICLE

CROSS REFERENCE TO RELATED APPLICATIONS

This application claims priority to German Patent Application No. 10 2011 082 532.0, filed Sep. 12, 2011 and PCT/EP2012/067862, filed Sep. 12, 2012.

FIELD OF THE INVENTION

The invention relates to a method for determining location data for a vehicle, to a control apparatus for performing the method and to a vehicle having the control apparatus.

BACKGROUND

DE 10 2006 029 148 A1 discloses what is known as a strapdown algorithm that determines location data for a vehicle on the basis of position data and driving dynamics data.

The location data of a vehicle are intended to be understood below to mean all data that influence the position of the vehicle in a space. These data therefore include the position data of the vehicle but also the driving dynamics data of the vehicle. The driving dynamics data are intended to be understood to mean all data that describe the movement of the vehicle.

DE 10 2006 029 148 A1 discloses that the performance of such methods determining the location data of a vehicle requires what are known as initial data, which will be referred to as an external anchor below.

It is an object of the invention to specify an improved method for determining location data for a vehicle.

The object is achieved by the features of the invention described herein.

SUMMARY AND INTRODUCTORY DESCRIPTION OF THE INVENTION

According to one aspect of the invention, a method for determining location data for a vehicle includes the steps of:
measurement of driving dynamics data for the vehicle,
measurement of at least one distance of the vehicle from a stationary object,
filtering of the driving dynamics data on the basis of the recorded distance.

The specified method is based on the consideration that the external anchor cited at the outset could be derived from what is known as a global positioning system signal, called GPS signal for short. This external anchor could then be used as a basis in the vehicle for either more precise definition of other data or even creation of new data. If an absolute location is known on the basis of the GPS signal, for example, it will be possible to use the inertial sensors, for example, to check and hence safeguard the output from the wheel speed sensors. Alternatively or in addition, the inertial sensors could be used to continue the absolute location of the vehicle even when the GPS signal has failed, for example in a tunnel, in order to create new data in this way, for example.

Within the framework of the specified method, however, it is recognized that an increasing number of vehicles are having ambient sensors installed, from which it is likewise possible to derive external anchors of this kind. These ambient sensors are used in the vehicle for safety reasons or for comfort purposes, and can significantly increase the precision of the location data cited at the outset, since these ambient sensors would allow objects in the surroundings of the vehicle to be recognized and to some extent classified.

In addition to the GPS signal, it is now possible to derive external anchors from the ambient sensors, and these can be recorded with much greater accuracy, particularly in comparison with the GPS signal itself, which means that the aforementioned more precise definition of the existent data or the creation of the new data could take place with a higher level of quality.

In this case, although the number of objects used can be chosen arbitrarily, the quality of the data that are to be defined more precisely and/or of the new data is increased with the number of objects used.

The specified method therefore raises the quality of the location data of the vehicle in the form of the position data and/or the driving dynamics data of the vehicle, for example in respect of reliability.

In this case, the filtering may include pure averaging without further consideration of other factors such as noise. If this also needs to be considered, a state observer or a Kalman filter would be suitable as a filter. If the shape of the noise also needs to be considered, a particle filter could be used if need be, which has a basic set of available noise scenarios and selects the noise scenario that needs to be considered for the elimination using a Monte Carlo simulation, for example.

In one development, the specified method includes the step of recording of an extent of the stationary object for the purpose of measuring the distance. This development is based on the consideration that not every stationary object is suitable as an external anchor. These stationary objects can be determined by recording the extent and then can be excluded from use when determining the external anchor.

The extent may include all three spatial directions, not all spatial directions involving the extent having an influence on usability when determining the external anchor. By way of example, the height of the stationary objects is irrelevant for determining the external anchor.

With particular preference, the specified method involves the at least one distance being measured in a direction 90° from the direction of travel of the vehicle or in a direction in the direction of travel of the vehicle if the extent of the stationary object exceeds a predetermined value. This development is based on the consideration that determining particular position information, such as the detection of a lane for the vehicle or the distance to a next turn-off, requires only quite particular spatial directions and that the external anchor then needs to satisfy the required accuracy only for these spatial directions. Therefore, by way of example, a wall with a comparatively extensive length on a road may also prove a sufficient reference for determining an external anchor that can be used to determine the lane of the vehicle on the road with sufficient accuracy.

In another development, the specified method includes the steps of:
recording of at least one further distance,
triangulation of the at least one distance and the at least one further distance, and
filtering of the driving dynamics data on the basis of the triangulated at least one distance and the at least one further distance.

This means that the external anchor can be determined on the basis of triangulation of a plurality of distances that are recorded over time. In this way, it is possible to raise the caliber of the external anchor and hence the quality of the data that are to be defined more precisely and/or the new data.

In yet another development, the specified method includes the step of rejection of the recorded of at least one distance if an error in the recorded at least one distance exceeds a predetermined value. This development is based on the consideration that, by way of example, distance sensors measure the distances that are used to determine the external anchor with an accuracy that is dependent on the range. If, by way of example, a distance is measured and the tolerance of the measured distance results in a tolerance for the external anchor that exceeds the tolerance of the anchor determined with the GPS signal, the correspondingly measured distance can be rejected, since it provides no additional information.

In an alternative development of the specified method, the driving dynamics data comprise a relative speed of the vehicle. Specifically, the external anchor can then be determined on the basis of the relative speed of the vehicle, this relative speed being able to be taken into account for the triangulation, for example.

In another development of the specified method, the filtering of the driving dynamics data on the basis of the recorded distance includes plausibilization of the driving dynamics data on the basis of the recorded distance and/or more precise definition of the driving dynamics data on the basis of the recorded distance.

In a particular development, the at least one distance is recorded with a camera or a distance sensor. By way of example, the camera can allow functions such as lane departure warning, road sign recognition or high beam assistant in the vehicle. The distance sensors used may be radar sensors, laser-based distance sensors, such as CV sensors, a stereo camera or ultrasonic sensors, for example. Particularly the ultrasonic sensors in the form of what are known as "parking bleepers" can be found in modern vehicles as standard today, which means that the specified method can be implemented inexpensively with a minimum of additional hardware.

In a preferred development, the stationary object is a post, a wall, a curbstone, a parked car or a recognizable feature in another stationary object. The recognizable feature in another stationary object may be a start or end of a wall, a distinctive change of shape or a change of color, for example.

According to a further aspect of the invention, a control apparatus is set up to perform a method as described herein.

In a development of the specified control apparatus, the specified apparatus has a memory and a processor. In this case, the specified method is stored in the memory in the form of a computer program, and the processor is provided for the purpose of executing the method when the computer program is loaded from the memory into the processor.

According to a further aspect of the invention, a computer program includes program code means in order to perform all the steps of one of the specified methods when the computer program is executed on a computer or one of the specified apparatuses.

According to a further aspect of the invention, a computer program product contains a program code that is stored on a computer-readable data storage medium and that, when executed on a data processing device, performs one of the specified methods.

According to another aspect of the invention, a vehicle includes a specified control apparatus.

BRIEF DESCRIPTION OF THE DRAWINGS

The properties, features and advantages of this invention that are described above and also the manner in which they are achieved become clearer and more distinctly comprehensible in connection with the description below of the exemplary embodiments, which are explained in more detail in connection with the drawings, in which:

FIG. 1 shows a basic illustration of an apparatus for determining location data for a vehicle.

FURTHER DETAILED DESCRIPTION OF THE INVENTION

Reference is made to FIG. 1, which shows an apparatus 2 for determining location data 4 for a vehicle that is not shown further.

The location data 4 are determined in a location determination device 6, which, in the present embodiment, is embodied as a computation unit that executes a strapdown algorithm, inter alia, which is known to a person skilled in the art.

The location determination device 6 determines the location data 4 of the vehicle on the basis of an initial position 8 of the vehicle that is not shown further, and updates said location data on the basis of driving dynamics data 7. The initial position 8 will be referred to below as what is known as an external anchor 8, which needs to be determined before the location data 4 are determined.

In the present embodiment, the external anchor 8 comes from a GPS signal 10 that has been output from a GPS appliance 12. In addition, an additional external anchor 9 can optionally also be derived from a local measurement signal 16 that is output from a local measuring device 14. For the sake of simplicity, the optional external anchor 9 is connected by means of a changeover switch 18 in the present embodiment, and this will be discussed in more detail later.

Since GPS signals are sufficiently well known to a person skilled in the art, the GPS signal 10 will not be illustrated in more detail, for the sake of brevity.

The local measuring device 14 receives an image 22 from a camera 20 and a distance signal 26 from a distance sensor 24.

In the present embodiment, the image 22 is supplied to an object recognition device 28 that determines suitable objects 30 for determining the external anchor 8 as an initial position for the location determination device 6 in the surroundings of the vehicle that is not shown in more detail. These objects 30 may be walls, posts, curbstones or parked vehicles in proximity to the vehicle on the road, for example. As objects 30, it is alternatively possible to search the aforementioned objects for changes of shape, changes of color, edges or other suitable features that are suitable for determining the external anchor 8.

The image 22 is also supplied together with the objects 30 found and the distances 26 measured by the distance sensor 24 to a computation device 32 that calculates the local measurement signal 16 that is suitable as an external anchor 8. To this end, the computation device can measure the distance 26 of the vehicle that is not shown to the identified object 30 over time, for example, and can triangulate it, together with a path calculated from the speed 34 of the vehicle, in a manner that is known to a person skilled in the art. The calculated local measurement signal 16, which is intended to be used as an additional external anchor 9, is finally output to the changeover switch 18.

The changeover switch 18 is set on the basis of a tolerance in the local measurement signal 16. This tolerance is dependent on the tolerance of the measured distance 26. The greater this distance 26, the greater the tolerance thereof owing to the respective measuring principle. The tolerance of the distance 26 and hence the tolerance of the local measurement signal 16 are determined in a tolerance evaluation device 36. If the tolerance of the local measurement signal 16 exceeds a particular threshold value, the local measurement signal 18 is not selected as an additional external anchor 9 using the changeover switch 18. Otherwise, the local measurement signal 16 is supplied to the location determination device 6 as an additional external anchor 9.

At this juncture, it should be mentioned that the location determination on the basis of the additional external anchor 9 is intended to serve only as an example of the purpose for which said anchor can be used. Ultimately, it can be used for any conceivable filtering. Thus, existent sensor data in the vehicle can be plausibilized, defined more precisely, corrected or freed of noise using the additional external anchor. It is also possible for the additional external anchor to be used to generate new data. WO 2011/098333 A1 has described how various sensor variables can be used in a vehicle in order to improve already existent sensor variables or to generate new sensor variables. The additional external anchor 9 is nothing other than a new additional sensor variable that can be used to expand the possibilities proposed in the cited document.

While the above description constitutes the preferred embodiment of the present invention, it will be appreciated that the invention is susceptible to modification, variation and change without departing from the proper scope and fair meaning of the accompanying claims.

The invention claimed is:

1. A method for determining location data for a vehicle, comprising the steps of:
   measuring driving dynamics data for the vehicle provided by at least one driving dynamics sensor of the vehicle;
   measuring at least one distance of the vehicle from a stationary object and recording the at least one distance using at least one of a camera and a distance sensor;
   determining if the stationary object is a suitable object based on the extent of the stationary object for the purpose of the measuring of the at least one distance;
   filtering the driving dynamics data on the basis of the recorded at least one distance to generate filtered driving dynamics data when the stationary object is a suitable object;
   updating the location data for the vehicle with the filtered driving dynamics data; and
   outputting the updated location data to a vehicle system.

2. The method as claimed in claim 1, further comprising the step of wherein if the extent of the stationary object exceeds a predetermined value then measuring the at least one distance in a direction 90° from the direction of travel of the vehicle or in the direction of travel of the vehicle.

3. The method as claimed in claim 1 further comprising the steps of:
   recording of at least one further distance;
   triangulation of the at least one distance and the at least one further distance; and
   filtering the driving dynamics data on the basis of the triangulated the at least one distance and the at least one further distance.

4. The method as claimed in claim 1 further comprising the step of rejecting the recorded at least one distance if an error in the recorded at least one distance exceeds a predetermined value.

5. The method as claimed in claim 1, further comprising the step of wherein the filtering of the driving dynamics data on the basis of the recorded distance includes plausibilization of the driving dynamics data on the basis of the recorded at least one distance or more precise definition of the driving dynamics data on the basis of the recorded at least one distance.

6. The method as claimed in claim 1 further comprising the step of wherein the stationary object is one or more of a post, a wall, a curbstone, a parked car or a recognizable feature in another stationary object.

7. A control apparatus having a processor, the processor of the control apparatus being configured to:
   measure the driving dynamics data for the vehicle from at least one driving dynamics sensor;
   measure at least one distance of the vehicle from a stationary object and recording the at least one distance using at least one of a camera and a distance sensor;
   determine if the stationary object is a suitable object based on the extent of the stationary object for the purpose of the measuring of the at least one distance;
   wherein the camera, the distance sensor, and the at least one driving dynamics sensor being in communication with the processor;
   filter the driving dynamics data on the basis of the recorded distance to generate filtered driving dynamics data when the stationary object is a suitable object;
   update the location data for the vehicle with the filtered driving dynamics data; and
   output the updated location data to a vehicle system.

8. The control apparatus as claimed in claim 7, wherein the control apparatus is located within a vehicle.

* * * * *